UNITED STATES PATENT OFFICE.

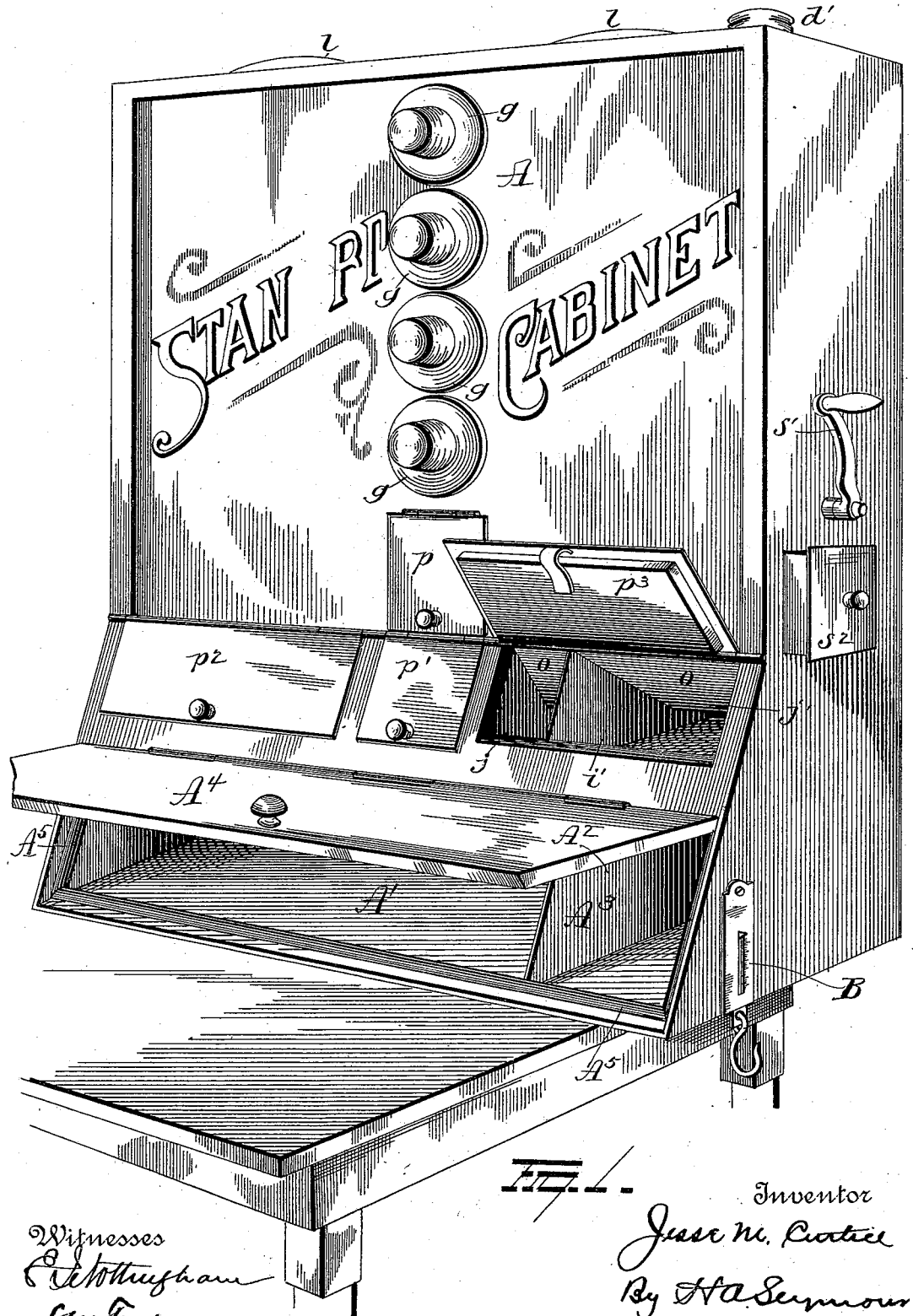

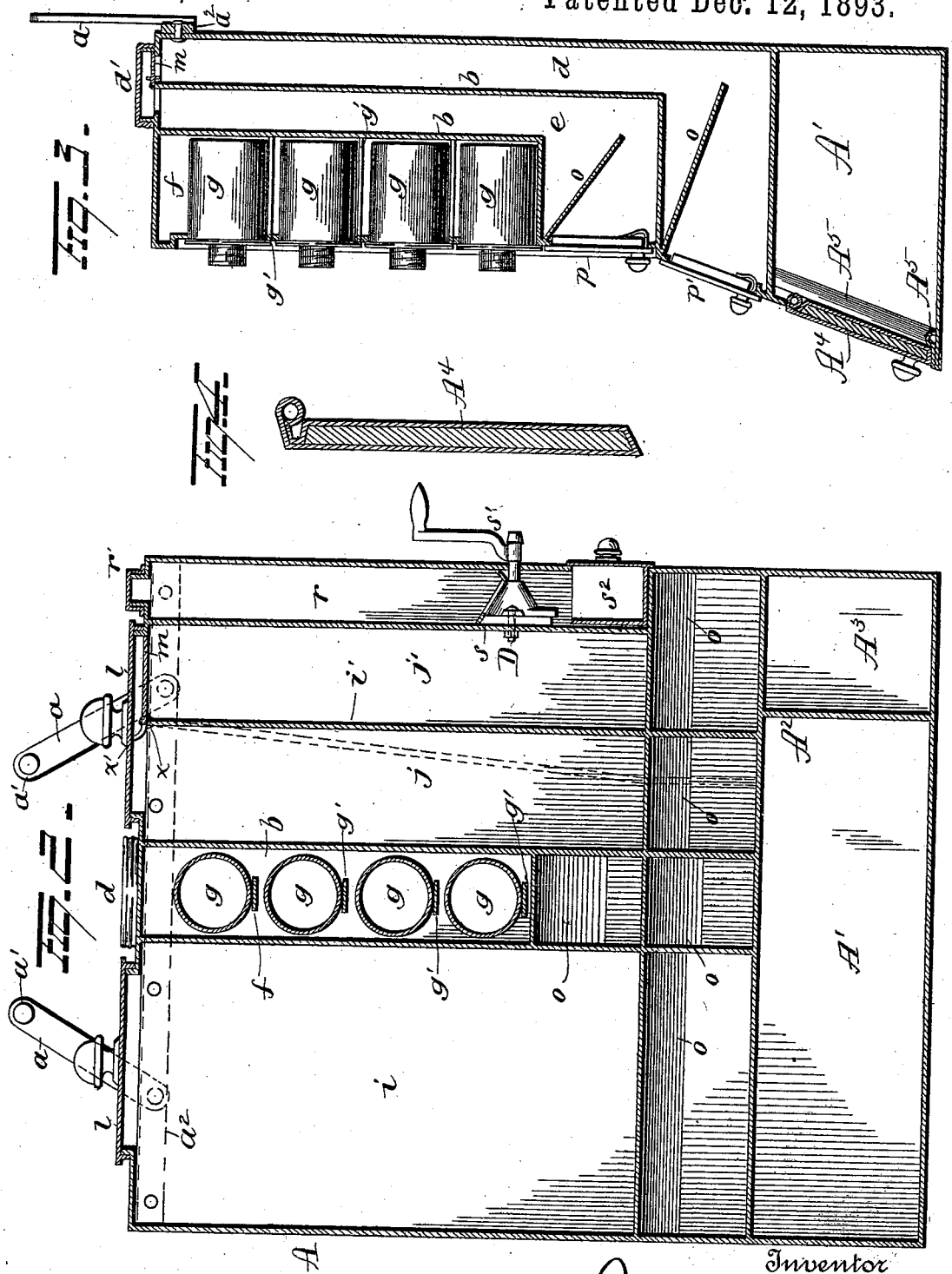

JESSE M. CURTICE, OF LOUISVILLE, KENTUCKY.

KITCHEN-CABINET.

SPECIFICATION forming part of Letters Patent No. 510,678, dated December 12, 1893.

Application filed July 20, 1893. Serial No. 480,989. (No model.)

*To all whom it may concern:*

Be it known that I, JESSE M. CURTICE, a resident of Louisville, in the county of Jefferson and State of Kentucky, have invented certain new and useful Improvements in Kitchen-Cabinets; and I do hereby declare the following to be a full, clear, and exact description of the invention, such as will enable others skilled in the art to which it appertains to make and use the same.

My invention relates to an improvement in kitchen cabinets,—the object of the invention being to construct a kitchen cabinet in such manner that a number of spice boxes can be employed,—so as to provide a large receptacle for the reception of articles of food,—to provide a compartment in said large receptacle for bottles and other small articles, and to provide a door for said large receptacle which shall be adapted to tightly close it and which will not be liable to bend or warp.

A further object is to provide a kitchen cabinet with bins for the reception of flour, meal and sugar, and to construct the bin for the reception of meal in such manner that it will be large enough at the bottom to receive a sifter.

A further object is to produce a kitchen cabinet which shall be simple in construction, ornamental in appearance, compact, and effectual in the performance of its functions.

With these objects in view the invention consists in certain novel features of construction and combinations and arrangements of parts as hereinafter set forth and pointed out in the claims.

In the accompanying drawings: Figure 1 is a perspective view of the device, showing it hanging against the wall in the proper position over the table. Fig. 2 is a longitudinal section. Fig. 3 is a vertical transverse section. Fig. 4 is a separate view of the door of the large receptacle.

In order to make the cabinet A, most convenient for the cook and to take up the least possible amount of room in the kitchen, it should be hung on the wall a convenient height over the table and far enough to the right for the scales B attached thereto, to be used and not come into contact with the table. This is accomplished by providing two iron straps or arms $a, a$, provided with perforations $a'$ at their upper ends and pivoted at their lower ends to another iron strap $a^2$, which is riveted to the upper edge of the back of the cabinet. The perforations $a'$ in the upper ends of the straps or arms $a$ are to be used to hang on nails driven in the studding of the kitchen wall. The straps or arms $a'$, are pivoted at their lower ends for the purpose of allowing the upper ends to accommodate themselves to nails driven in the studding, which latter may be a greater or less distance apart, thereby allowing the cabinet to always be hung securely on the nails driven firmly in the studding of a plastered or frame wall, without changing the location of the straps on the cabinet.

At the bottom of the cabinet a large safe or receptacle $A'$ is located for the reception of bread, cakes, cold meat and other things that may be desired to be kept handy to the kitchen table and in a metallic safe or repository to prevent evaporation and free from dust, insects and vermin. Near one end of the safe or receptacle, a partition $A^2$ is located, thus forming a small compartment $A^3$ for the reception of bottles of extracts, salt box, nutmeg graters, kitchen spoons, knives, &c., that are needed at the kitchen table. The safe or receptacle $A'$ being of considerable length, it is necessary to construct the door $A^4$ thereof so that it will not be liable to bend or warp,—the former defect being encountered in the use of such a door made entirely of sheet metal and the latter defect being encountered with a door made entirely of wood. I therefore propose to construct the body of the door $A^4$ of wood and cover it with sheet metal, as shown in Fig. 4. The door thus constructed prevents any possibility of the wood warping and the wood prevents the tin from being bent, causing the door always to remain straight. A door thus constructed and hinged as this is at its upper edge will always drop shut by its own gravity, and when shut owing to its peculiar construction it forms a brace to the lower edge of the cabinet preventing the latter from bending or yielding during handling. The receptacle $A'$ is provided with round door jambs, A⁵, which are cheap of construction and effectively prevent the safe from being bent out of shape so the door will not fit snugly.

Above the safe or receptacle A', the body A of the cabinet is located. The body of the cabinet A is divided into two large compartments by means of a narrow central compartment which extends from the top of the cabinet to the safe or receptacle A', forming a double-walled partition through the center of the cabinet. The central compartment is sub-divided by two L-shaped partitions $b, b$, into three chambers $d, e, f$. The front chamber $f$ received a row or series of, preferably five cylinder-shaped, screw-top, air tight drawers or cans $g$, of suitable size to hold spice, cloves, ginger, cinnamon or other articles that lose their strength in the open air or impregnate each other or other things with their aroma, said drawers resting on suitable plates $g'$ within the chamber $f$. The chambers $d, e$, are to be used as bins to contain tea, ground coffee, coffee-sugar, or other groceries that are used in small quantities. The bins $d, e$, are adapted to be filled through the top, which will be closed when filled by a screw cap $d'$, thereby making them air tight and preventing loss of strength of the contents.

To the left of the central compartment is a bin $i$, intended to contain flour. The compartment to the right of the central compartment is sub-divided by a partition $i'$, into two bins $j, j'$, which are intended to contain sugar and meal respectively. The partition $i'$ is disposed at one side of the center of the right hand compartment, thus making the lower end of the bin $j$ narrow and the lower end of the bin $j'$ sufficiently wide for the reception of a sifter, whereby the meal in the bin $j'$ can be taken out and sifted. Sugar needing no sifting, the lower end of the bin containing it can be narrow. The partition $i'$ may be set obliquely to further increase the width of the lower end of the bin $j'$, as shown in Fig. 2. Each of the side compartments is provided with a pressed bucket cover top $l, l$, which effectually closes the opening after the bins have been filled. The bins $d$, $e$ and $j, j'$ being filled through common openings, are provided with false half-tops $m$, to cover one bin while the other is being filled, to prevent the materials from falling into the wrong bins. The false half-tops are hinged to the partitions in any suitable manner, preferably, by means of wires $x$, and each half-top is provided with thumb pieces $x'$ by means of which to operate them. The bins $d$, $e, j, j'$ and $i$ are provided with false bottoms $o, o, o, o, o$, which extend from the front of the cabinet toward the back, sloping downwardly in such manner as to cause most of the contents to rest on the false bottoms, allowing only a sufficient amount to lie on the bottoms of the bins ready to be dipped out with a scoop through doors $p, p', p^2, p^3$, hinged to the front of the cabinet,—the doors $p, p'$ being arranged one above the other and the door $p'$ being disposed between the doors $p^2, p^3$.

There is a chamber $r$ taken from the front right hand corner of the bin $j'$, which chamber extends from the top of the cabinet to near the bottom and is furnished with a removable screw cap $r'$. This chamber is intended for coffee and to this end a grinding mill D is bolted to a block of wood $s$ and the back of the chamber near the bottom thereof by bolts passing through the mill, the block, and the back of the chamber. Said mill is fed automatically by the coffee in the chamber above and is operated by the usual crank $s'$, which projects through the end of the cabinet. A drawer $s^2$ in the space below the mill receives the ground coffee as it passes through the mill.

My improvements are very simple in construction, cheap to manufacture and efficient, in every respect, in the performance of their functions.

Having fully described my invention, what I claim as new, and desire to secure by Letters Patent, is—

1. As an article of manufacture a kitchen cabinet divided by transverse vertical partitions into three independent compartments, the middle compartment being again subdivided into a series of chambers; the several chambers and compartments having rearwardly and downwardly inclined false bottoms, doors for covering the outlets to said compartments and one of said compartments provided with screw capped air tight cylinder shaped drawers, a horizontal partition extending across near the lower end of the cabinet whereby a lower compartment is formed running lengthwise the cabinet, door jambs located a short distance within the outer edge of this compartment, and a door hinged at its upper edge to the cabinet and composed of a wooden center faced on both sides with sheet metal to give it sufficient weight to fall shut by its own gravity when opened and sufficient strength to form a brace when shut to the lower edge of the cabinet to prevent bending or yielding at this point during handling, substantially as set forth.

2. A kitchen cabinet made of sheet metal and divided into a series of compartments, with doors and covers for the several compartments, a strengthening strap attached to the rear upper edge and extending approximately throughout the width of the cabinet, and the straps pivoted at their lower ends to said strengthening strap and provided with holes at their upper ends.

3. A kitchen cabinet subdivided into a series of compartments by sheet metal partitions, one of said compartments having a drawer therein, a block located against one of the partitions and over the drawer, and a grinding mill resting against the block and directly over the drawer, the said mill and block being held in place by bolts passing through the mill, block and partition, substantially as set forth.

In testimony whereof I have signed this specification in the presence of two subscribing witnesses.

JESSE M. CURTICE.

Witnesses:
W. M. HENSON,
J. M. RIDLER.